(12) United States Patent
Wang et al.

(10) Patent No.: US 12,345,139 B2
(45) Date of Patent: Jul. 1, 2025

(54) ONE WAY CLUTCH TRAIN FOR ARRESTING BACKSPIN

(71) Applicant: Baker Hughes Oilfield Operations LLC, Houston, TX (US)

(72) Inventors: Chengbao Wang, Oklahoma City, OK (US); Zheng Ye, Claremore, OK (US); David Tanner, Broken Arrow, OK (US); Randal Perisho, Tulsa, OK (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 18/202,394

(22) Filed: May 26, 2023

(65) Prior Publication Data

US 2023/0383632 A1 Nov. 30, 2023

Related U.S. Application Data

(60) Provisional application No. 63/346,166, filed on May 26, 2022.

(51) Int. Cl.
*E21B 43/12* (2006.01)
*F04D 13/02* (2006.01)
(Continued)

(52) U.S. Cl.
CPC .......... *E21B 43/128* (2013.01); *F04D 13/021* (2013.01); *F04D 13/022* (2013.01);
(Continued)

(58) Field of Classification Search
CPC ...... E21B 43/128; F04D 13/10; F04D 13/021; F04D 13/086; F04D 29/044; F04D 13/022; F04D 13/08; F16D 41/12; F16D 23/06
See application file for complete search history.

(56) References Cited

U.S. PATENT DOCUMENTS 4,262,786 A * 4/1981 Taylor ................ F16D 41/12
192/48.92
11,067,138 B2 * 7/2021 Leonov ............. F16D 41/185
(Continued)

FOREIGN PATENT DOCUMENTS

WO 2017153851 A1 9/2017

OTHER PUBLICATIONS

International Search Report and Written Opinion for PCT Application No. PCT/US2023/023659 dated Sep. 14, 2023.

*Primary Examiner* — Peter J Bertheaud
(74) *Attorney, Agent, or Firm* — Bracewell LLP; Keith R. Derrington

(57) ABSTRACT

An ESP system having a driveshaft assembly; an electrical motor coupled with an end of the driveshaft assembly, and that when energized rotates the driveshaft assembly in a first direction. The ESP system also includes a pump coupled with an end of the driveshaft assembly distal from the motor, and a one-way clutch train in the driveshaft assembly that arrests rotation of the driveshaft assembly in a second direction. In this example the driveshaft assembly includes a pump shaft having an end engaged with an end of a motor shaft; opposing ends of the pump and motor shafts respectively couple with the pump and motor. The one-way clutch train includes a shaft-to-shaft clutch coupled between inner and outer surfaces of the pump and motor shafts and a shaft to housing clutch coupled between an outer surface of one of the pump and motor shafts and an outer housing.

15 Claims, 5 Drawing Sheets

(51) Int. Cl.
  *F04D 13/08* (2006.01)
  *F04D 13/10* (2006.01)
  *F04D 29/044* (2006.01)
  *F16D 23/06* (2006.01)
  *F16D 41/067* (2006.01)
  *F16D 41/12* (2006.01)

(52) U.S. Cl.
  CPC ............ *F04D 13/08* (2013.01); *F04D 13/086* (2013.01); *F04D 13/10* (2013.01); *F04D 29/044* (2013.01); *F16D 23/06* (2013.01); *F16D 41/12* (2013.01); *F16D 41/067* (2013.01)

(56) References Cited

U.S. PATENT DOCUMENTS

| | | |
|---|---|---|
| 11,608,721 B2 | 3/2023 | Perisho et al. |
| 2004/0134693 A1 | 7/2004 | Yamagishi et al. |
| 2017/0159413 A1 | 6/2017 | Morrison |
| 2020/0063541 A1* | 2/2020 | Davis .................... E21B 43/128 |
| 2020/0166088 A1 | 5/2020 | Leonov |
| 2021/0095674 A1 | 4/2021 | Lu et al. |
| 2023/0070148 A1 | 3/2023 | Ye et al. |

\* cited by examiner

ONE WAY CLUTCH TRAIN FOR ARRESTING BACKSPIN

RELATED APPLICATIONS

This application claims priority to and the benefit of co-pending U.S. Provisional Application Ser. No. 63/346,166 filed on May 26, 2022, which is incorporated by reference herein in its entirety and for all purposes.

BACKGROUND OF THE INVENTION

1. Field of Invention

The present disclosure relates to arresting backspin in an electrical submersible pumping system drive shaft with a train of one-way clutch assemblies.

2. Description of Prior Art

Electrical submersible pumps ("ESP") are commonly used in hydrocarbon producing wells. Typically, ESP systems include an electrical motor, a pump having impellers and diffusers, and a driveshaft connected between the motor and pump. The driveshaft is attached to the impellers, and the shaft and impellers rotate when the motor is energized. Rotating impellers draws fluid from inside the well into the pump and forces the fluid through the diffusers, which pressurizes the fluid for delivery to surface.

In some instances, such as when the motor is not energized and there is a column of well fluid above the impellers, fluid in the column is gravity driven downhole across the impellers and rotates the impellers in a direction opposite their rotation during pressurization. The connected driveshaft also rotates to backspin the motor which generates electricity that is conducted up the well along a power cable connected from surface to the motor. This electricity creates undesired effects, such as posing a hazard for personnel operating the well. Thus, a need exists for a way to arrest backspin in ESP motors that does not introduce frictional forces onto the driveshaft when operating the pump.

SUMMARY OF THE INVENTION

An example of an electrical submersible pumping ("ESP") system is disclosed which includes a driveshaft assembly having elongated segments, an electrical motor coupled with an end of the driveshaft assembly, and that when energized rotates the driveshaft assembly in a first direction, a pump coupled with an end of the driveshaft assembly distal from the motor, and a one-way clutch train in the driveshaft assembly that is rotationally disengaged with the driveshaft assembly when the driveshaft assembly rotates in the first direction, and that is in rotationally engaged with the driveshaft assembly when the driveshaft assembly rotates in a second direction that is opposite to the first direction. In this example, the driveshaft assembly is made up of a shaft-to-shaft clutch coupled between adjacent segments on an outer surface of one of the segments and an inner surface of an adjacent segment, and a shaft to housing clutch coupled between one of the segments and an outer housing. Example segments include a pump shaft and a motor shaft, the pump shaft having an end selectively coupled with an end of the motor shaft, and opposing ends of the pump and motor shafts respectively couple with the pump and motor. In this example, the shaft to housing clutch is selectively changeable between an engaged configuration and a disengaged configuration, when in the engaged configuration the housing is rotationally coupled to the pump shaft by the shaft to housing clutch, and wherein when in the disengaged configuration the pump shaft is rotatable with respect to the housing. Further in this example, changing a rotational direction of the pump shaft changes the shaft to housing clutch between the engaged configuration and the disengaged configuration. In an alternative, the shaft-to-shaft clutch is selectively changeable between an engaged configuration and a disengaged configuration, where when in the engaged configuration the motor shaft is rotationally coupled to the pump shaft by the shaft-to-shaft clutch, and where when in the disengaged configuration the pump shaft is rotatable with respect to the motor shaft; alternatively, changing a rotational direction of the motor shaft changes the shaft-to-shaft clutch between the engaged configuration and the disengaged configuration. The motor shaft optionally includes a receptacle that receives the end of the pump shaft distal from the pump and where the shaft-to-shaft clutch is disposed in the receptacle. Further in this example, the shaft-to-shaft clutch includes an outer race press fit inside the receptacle, and inner race press fit onto an outer surface of the pump shaft, and sprag type elements between the inner and outer races. The sprag type elements are optionally generally planar elements that are pivotable about an axis that is substantially parallel with an axis of the ESP assembly. In an alternative, the sprag type elements are strategically dimensioned so that opposing ends of the sprag type elements are wedged between the inner and outer races when elongate widths of the sprag type elements are oriented radially from the axis, where the sprag type elements are selectively oriented radially from the axis in response to rotation of the outer race with respect to the inner race in a first direction. In this example, when the sprag type elements become wedged between the inner and outer races, the clutch assembly is in an engaged configuration and relative rotation of the outer race to the inner race in a first direction is arrested. In an embodiment, the sprag type elements are in sliding contact with the inner and outer races when the elongate widths of the sprag type elements are oriented oblique to the axis, and the sprag type elements are selectively oriented oblique to the axis in response to rotation of the outer race with respect to the inner race in a second direction that is opposite the first direction. Optionally, when the segments are rotationally coupled to one another and rotatable about an axis, the segments are in non-arresting engagement, and wherein when the one-way clutch is selectively changeable between a locked configuration in which one of the segments is rotationally fixed in place and a spinning configuration in which adjacent segments are freely rotatable with respect to one another, the segments are in arresting engagement.

Another example of an electrical submersible pumping ("ESP") system is disclosed and that includes a housing, an electrical motor that when energized generates rotational force in a first direction, a pump, and a driveshaft assembly coupled between the motor and the pump. Included with the driveshaft assembly is a pump shaft having an end coupled with the pump, a motor shaft having an end coupled with the motor, a shaft-to-shaft clutch comprising a plurality of sprag type elements disposed in an annulus between the pump shaft and motor shaft, the sprag type elements being changeable between a radial orientation in which a rotational torque is transferred between the pump shaft and motor shaft through the plurality of sprag type elements, and an oblique orientation in which the pump shaft and motor shaft are rotatable with respect to one another. In an alternative, the plurality of sprag type elements is a first plurality of sprag type elements, the system further having a shaft to housing clutch with a second plurality of sprag type element disposed in an annulus between the pump shaft and housing, the second plurality of sprag type elements being changeable between a radial orientation in which a rotational torque is transferred between the pump shaft and housing through the second plurality of sprag type elements, and an oblique orientation in which the pump shaft is rotatable with respect to the housing. In an example, the first plurality of sprag type elements are in the radial orientation when the motor shaft is rotated by the motor in a first direction so that the pump shaft is also rotated in the first direction, and where the second plurality of sprag type elements are in the oblique configuration when the pump shaft is rotated in the first direction, so that when the motor is energized, rotational torque from the motor is transferred to the pump through the driveshaft assembly. In embodiments, the second plurality of sprag type elements are in the radial configuration when a rotational torque is applied to the pump shaft in a second direction that is opposite to the first direction, which rotationally couples the pump shaft to the housing and arrests rotation of the pump shaft, where the first plurality of sprag type elements are in the radial orientation when the motor shaft is rotated by the motor in a first direction so that the pump shaft is also rotated in the first direction, and so that when the motor is energized, rotational torque from the motor is transferred to the pump through the driveshaft assembly. The pump shaft optionally includes an axial passage, a port extending radially to an outer surface of the pump shaft from the passage, and an opening in the passage at a downhole end of the pump shaft, and wherein a magnetic sump is provided adjacent the opening, so that when the pump shaft rotates, a fluid flow is induced into the opening, through the passage, and out the port, and wherein metal particles are pulled from the fluid flow and retained in the sump.

BRIEF DESCRIPTION OF DRAWINGS

Some of the features and benefits of the present invention having been stated, others will become apparent as the description proceeds when taken in conjunction with the accompanying drawings, in which.

Figures 1, 6:
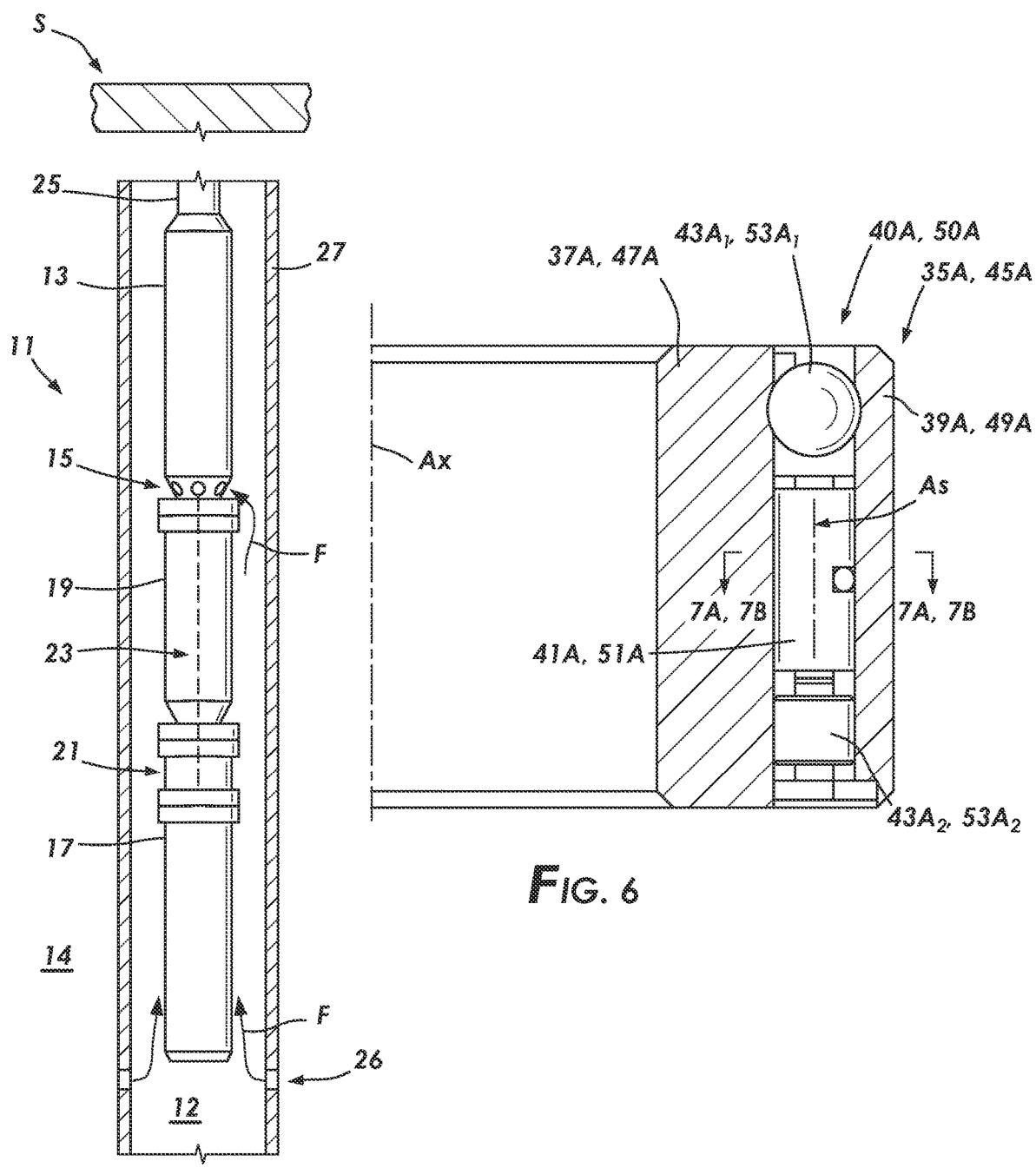
FIG. 1 is a side partial sectional view of an example of an electrical submersible pumping ("ESP") system disposed in a well.
FIG. 6 is an enlarged view of the sub of FIG. 2.

While subject matter is described in connection with embodiments disclosed herein, it will be understood that the scope of the present disclosure is not limited to any particular embodiment. On the contrary, it is intended to cover all alternatives, modifications, and equivalents thereof.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of a cited magnitude. In an embodiment, the term "substantially" includes +/−5% of a cited magnitude, comparison, or description. In an embodiment, usage of the term "generally" includes +/−10% of a cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Shown in an elevational partial sectional view in FIG. 1 is an example of an electrical submersible pumping ("ESP") system 11 disposed in a well 12. Described in more detail below is that the ESP system 11 has a pump 13 to lift fluid F from within the well 12 to surface S, fluid F is produced from a formation 14 surrounding well 12. Included with pump 13 is an intake 15 for drawing the fluid F into the pump 13 in which the fluid F is pressurized. The pump 13 is driven by a motor 17 shown mounted on an end of the ESP system 11 distal from pump 13; in an example motor 17 is electrically powered with a cable (not shown) which connects to a power source on surface S for delivering electrical power and operating the ESP system 11. The ESP system 11 includes a seal section 19 shown disposed between the pump 13 and motor 17 that selectively provides pressure equalization between a fluid (e.g. dielectric, lubricating, or cooling fluid) within motor 17 and ambient conditions in well 12.

In the example of FIG. 1, a reverse rotation arresting sub 21 is illustrated mounted to an upper end of motor 17 and between motor 17 and seal 19. Shown in a dashed outline is a driveshaft assembly 23 that is rotationally coupled between the motor 17 and pump 13. In examples, pump 13 is a centrifugal pump having impellers (not shown) stacked within its housing and coupled with the driveshaft assembly 23. Included in this example are diffusers (not shown) stacked within the housing having passages that selectively register with and receive fluid from passages in the impellers as the impellers rotate. The respective passages form a fluid flow path within pump 13 in which fluid in the well 12 is pressurized as it travels up the fluid flow path. As described in more detail below, sub 21 selectively arrests rotation of driveshaft assembly 23 to prevent backspin within motor 17.

Motor 17 of FIG. 1 includes an elongated rotor stack (not shown) mounted to driveshaft assembly 23, rotor stack is disposed within and rotatable with respect to a stator (not shown) within motor 17. Rotor stack of this example optionally includes a permanent magnet with poles spaced angularly away about a circumference of driveshaft assembly 23. Electricity from cable to stator generates a rotating electromagnetic field that causes the rotor stack to rotate in a first direction that rotates driveshaft assembly 23 and impellers to pressurize well fluid as described above. In a non-limiting example of operation, backspin describes rotation of driveshaft assembly 23 and rotor in motor 17 in a second direction that is opposite to the first direction. Motor 17 potentially generates electricity when the rotor stack is rotated in the second direction. When viewed from uphole, the first direction is clockwise and the second direction is counter-clockwise, and in alternatives when viewed from uphole, the first direction is counter-clockwise and the second direction is clockwise.

Also included in FIG. 1 is production tubing 25 shown connected to the ESP system 11 on an uphole end (i.e., closer to surface S) of pump 13. In the example shown, tubing 25 provides a conduit for directing fluid pressurized by pump 13 to surface S, such as to a wellhead assembly (not shown) from which the fluid is transmitted for processing or refining. Fluid F is shown entering the well 12 through perforations 26 that extend radially from well 12 through casing 27 shown lining the sidewalls of well 12 and into formation 14. Casing 27 is shown as a solid metal tubular, and provides isolation between well 12 and the surrounding formation 14.

Figure 2:
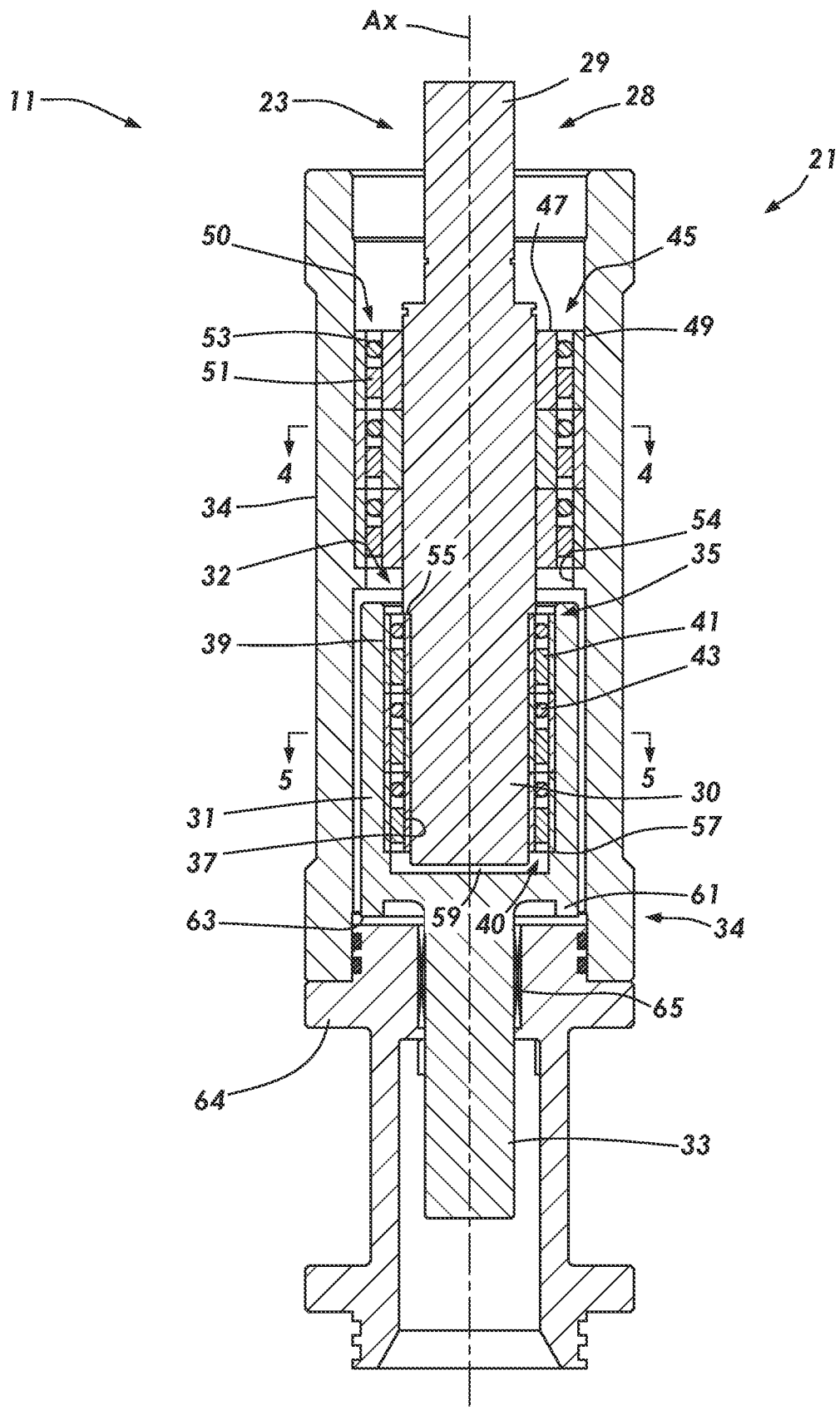
FIG. 2 is a side sectional view of an example of a reverse rotation arresting sub for use with the ESP system of FIG. 1.

Referring now to FIG. 2, shown in a side sectional view is an example portion of ESP system 11 having the sub 21. In this example driveshaft assembly 23 includes a pump shaft 28 having an uphole end 29 that is rotationally affixed with the pump 13 (FIG. 1) and a downhole end 30, opposite uphole end 29, which is selectively rotationally engaged with a motor shaft 31. Motor shaft 31 includes a receptacle 32 having a diameter greater than a diameter of downhole end 30 and that receives the downhole end 30. Shaft 31 includes a lower end 33 shown on a side opposite receptacle 34 and projects axially from within an outer housing 34 that covers sub 21 and, circumscribes shafts 29, 31. Housing 34 is shown as made of multiple segments, in alternatives housing 34 is a single piece.

The pump shaft 28 and motor shaft 31 are selectively rotationally coupled to one another by a shaft-to-shaft clutch 35 shown disposed in an annular void between the inner surface of receptacle 32 and outer surface of downhole end 30. Clutch 35 includes an annular inner race 37 which affixes to an outer surface of the downhole end 30 and an annular outer race 39 coupled with an inner surface of the receptacle 32. In alternatives, races 37, 39 are press fit to end 30 and receptacle 32 respectively. In the example shown races 37, 39 are substantially coaxial and circumscribe axis $A_X$ of ESP assembly 11. Between inner and outer races 37, 39 is a clutch assembly 40 having clutch members 41 that are configured to allow downhole shaft 30 to rotate relative to shaft 31 when either of the shafts 30, 31 rotates in one direction, and to rotationally couple the shafts 30, 31 when either of the shafts 30, 31 rotates in an opposite direction. In an example, clutch assembly 40 is in a disengaged configuration when the shafts 30, 31 are rotatable to one another, and in an engaged configuration when the shafts 30, 31 are coupled. Further in this example, clutch assembly 40 is in the engaged configuration when the races 37, 39 are rotationally coupled or affixed with one another, and in the disengaged configuration when the races 37, 39 are rotatable with respect to one another. Within the clutch assembly 40 are clutch members 41 that provide the selective coupling between the inner and outer races 37, 39; bearings 43 are also illustrated as a part of clutch assembly 40 that provide for ease of rotation between the inner and outer races 37, 39.

A shaft-to-housing clutch 45 is also included in the sub 21 and is disposed in an annular void between a portion of the pump shaft 28 and an inner surface of housing 34. Similar to clutch 35, shaft-to-housing clutch 45 includes an annular inner race 47 coupled to an outer surface of the pump shaft 28, an annular outer race 49 coupled to an inner surface of housing 34, and a clutch assembly 50 disposed between the inner and outer races 47, 49. As shown, inner race 47 couples to a portion of pump shaft 28 proximate its uphole end 29.

In alternatives, races 47, 49 are press fit to shaft 28 and housing 34 respectively. In this example, the clutch assembly 50 also includes clutch members 51 and bearings 53 similar to those provided with clutch 35. A ridge 54 is shown projecting radially inward from the inner surface of housing 34 and which circumscribes axis $A_X$. In alternatives, shaft-to-shaft clutch 35 includes two or more sets of clutch assemblies 40 stacked substantially coaxially in the annular space between shaft 28 and housing 34 and optionally in abutting contact with one another; and/or shaft to housing clutch 45 includes two or more sets of clutch assemblies 50 stacked substantially coaxially in the annular space between shaft 28 and inner surface of receptacle 32 and optionally in abutting contact with one another.

Still referring to FIG. 2, a downward-facing shoulder 55 is defined where a diameter of the pump shaft 28 transitions radially inward proximate its downhole end 30 and adjacent an uphole end of clutch 35, an upward-facing radial surface of inner race 37 is shown abutting shoulder 55. Similarly, an upward-facing shoulder 57 is defined where an inner diameter of receptacle 32 transitions radially outward adjacent an end of the clutch 35 distal from shoulder 55, which is shown supporting a lower radial surface of outer race 39. The combination of shoulders 55, 57 provide an axial support for pump shaft 28, and in the example shown the location of shoulders 55, 57 and axial dimensions of races 37, 39 form a gap 59 between a lower terminal end of downhole end 30 and a lowermost portion of receptacle 32. Also shown in FIG. 2 is that a skirt 61 is formed on a downward-facing surface of receptacle 32 and spaced radially outward from an outer surface of motor shaft 31 adjacent receptacle 32. A thrust bearing 63 is shown disposed between an end of skirt 61 facing away from shaft 28 and a base section 64 of sub 21. A journal bearing 65 is shown formed between housing 34 and a portion of shaft 31 below receptacle 32.

Figure 3:
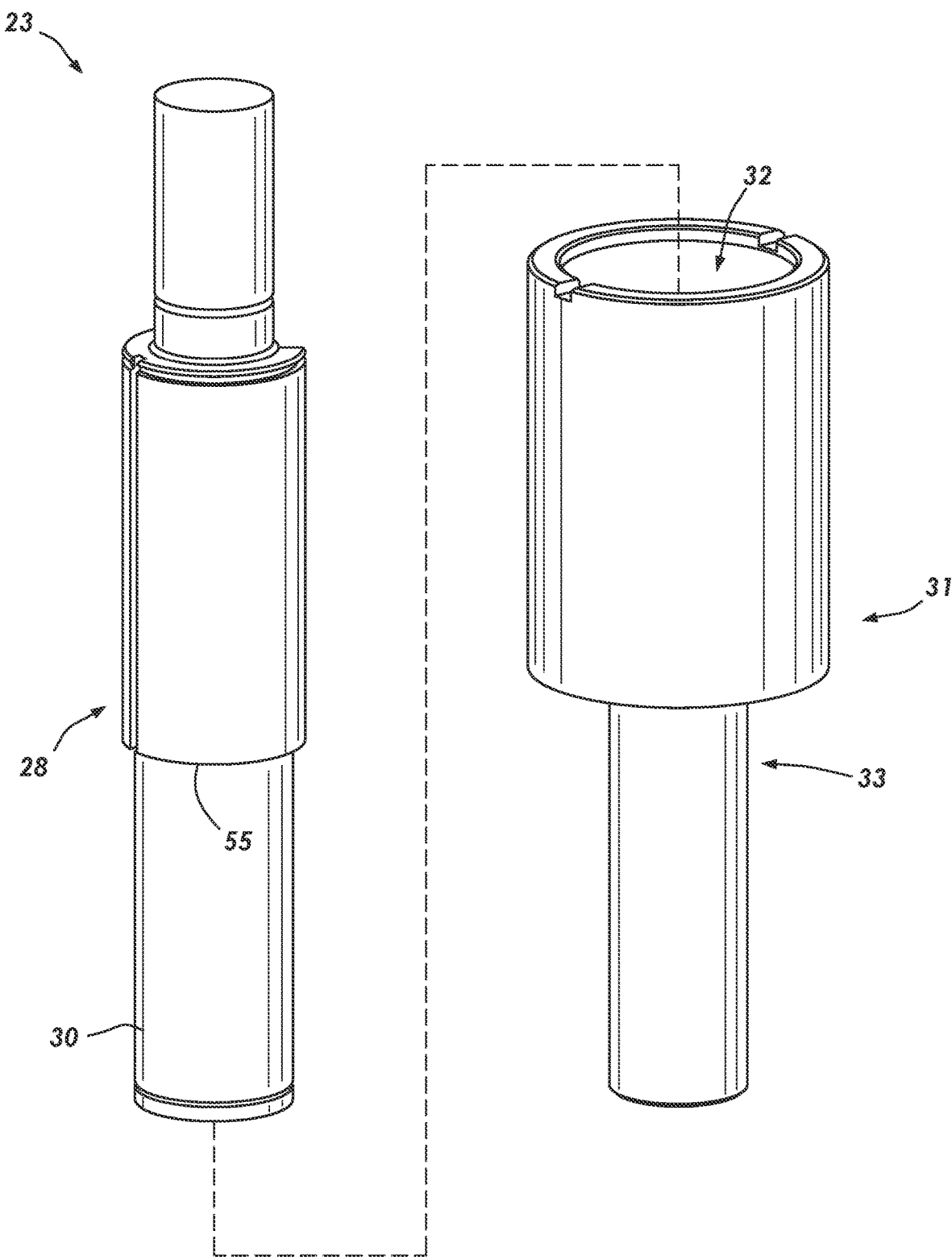
FIG. 3 is an exploded view of a driveshaft assembly for use with the ESP system of FIG. 1.

Illustrated in FIG. 3 is a partially exploded view of the driveshaft assembly 23 depicting each of the pump shaft 28 and the motor shaft 31 adjacent one another. The end of shaft 31 adjacent shaft 28 is enlarged with receptacle 32 to receive a lower end of shaft 28. And shoulder 55 is shown facing downward.

Figure 4:
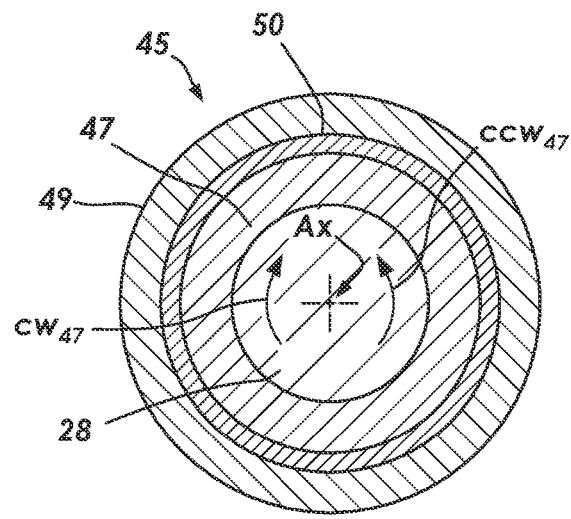
FIG. 4 is an axial sectional view of a portion of the reverse rotation arresting sub of FIG. 2 and taken along lines 4-4.

Referring now to FIG. 4, shown is an axial sectional view of an example of the shaft-to-housing clutch 45 and taken along lines 4-4 of FIG. 2. Here, clutch assembly 50 is schematically represented in the annular void between inner and outer races 47, 49. Clutch assembly 50 selectively rotationally couples inner and outer races 47, 49 when a rotational force is applied to one or both of races 47, 49 to rotate both races 47, 49 in one direction; and allows relative rotation in a direction opposite to the one direction. As shown shaft 28 is rotationally affixed to inner race 47 and housing 34 is rotationally affixed to outer race 49, so that the clutch assembly 50 rotationally affixes shaft 28 to housing 34 when shaft 28 is rotated in the one direction and allows free rotation of shaft 28 in the opposite direction. For the purposes of discussion herein, clutch assembly 50 is in an engaged configuration when the races 47, 49 are rotationally coupled or affixed with one another, and in a disengaged configuration when the races 47, 49 are rotatable with respect to one another. Accordingly, when clutch assembly 50 in the engaged configuration shaft 28 is rotationally coupled with housing 34 and not free to rotate with respect to housing 34 When clutch assembly 50 is in the disengaged configuration, shaft 28 is rotatable with respect to housing 34.

Figure 5:
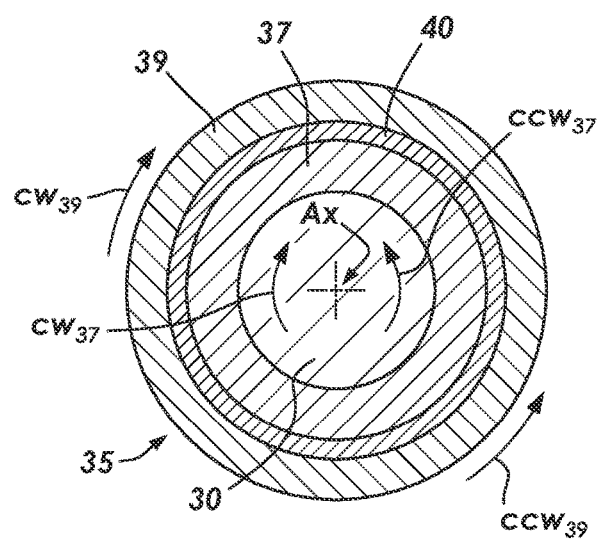
FIG. 5 is an axial sectional view of a portion of the reverse rotation arresting sub of FIG. 2 and taken along lines 5-5.

FIG. 5 shows an axial sectional view of the shaft-to-shaft clutch 35 and taken along lines 5-5 of FIG. 2. In this example, the clutch assembly 40 is disposed in an annular space between inner and outer races 37, 39 and rotationally couples races 37, 39 when either of races 37, 39 rotate in one direction, and allows relative rotation between the races 37, 39 when relative rotation occurs in an opposite direction. In a non-limiting example of operation, as illustrated by arrow $CW_{37}$, clutch assembly 40 allows rotation of inner race 37 relative to outer race 39 in a clockwise direction; and restricts rotation of inner race 37 relative to outer race 39 in a counterclockwise direction (as illustrated by arrow $CCW_{37}$), and which rotationally affixes or couples races 37, 39. In this example outer race 39 is rotatable in a counterclockwise direction (as illustrated by arrow $CCW_{39}$) relative to inner race 37, and restricted from rotating in a clockwise direction (as illustrated by arrow $CW_{39}$) relative to inner race 37. Alternatively in this example, clutch assembly 50 allows inner race 47 to rotate relative to outer race 49 in a clockwise direction (as illustrated by arrow $CW_{47}$); and restricts rotation of inner race 47 relative to outer race 49 in a counterclockwise direction (as illustrated by arrow $CCW_{47}$), and which rotationally affixes or couples races 47, 49. In this alternative, outer race 49 is rotatable in a counterclockwise direction (as illustrated by arrow $CCW_{49}$) relative to inner race 47, and restricted from rotating in a clockwise direction (as illustrated by arrow $CW_{49}$) relative to inner race 47. Optionally these rotational directions are reversed in one or both of the clutch assemblies 40, 50.

Referring now to FIG. 6, an enlarged view of a portion of FIG. 2 in shown and illustrates in more detail embodiments of the elements making up the clutch assemblies 40A, 50A of the clutches 35A, 45A. For convenience, clutch assemblies 40A, 50A are superimposed in a single example and their respective elements are referenced within this figure. Clutch assemblies 40A, 50A in this example include bearings $43A_1$, $53A_1$ which are depicted as spherical members or ball bearings; and bearings $43A_2$, $53A_2$ which are depicted as needle or roller bearings. Further shown is that the clutch members 41A, 51A are represented as sprag type elements and that can pivot about an axis $A_S$ shown generally parallel to axis $A_X$ of the ESP assembly 11 (FIG. 1). In the example shown, sprag type elements are generally planar with a length extending along axis $A_S$, and a width and thickness (or height) that are each transverse to axis $A_S$ and to one another. In embodiments, included with clutch assemblies 40A, 50A are a multiplicity of bearings $43A_1$, $53A$ and clutch members 41A, 51A that circumscribe axis $A_X$.

Figure 7A:
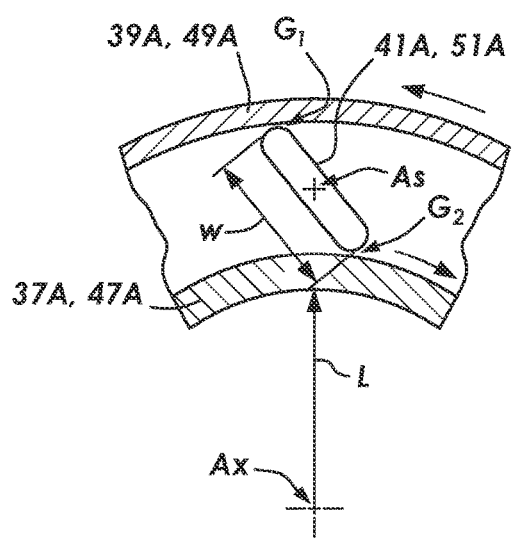
FIGS. 7A and 7B are schematic axial views of a clutch respectively in free spinning and locking configurations.
Figure 7B:
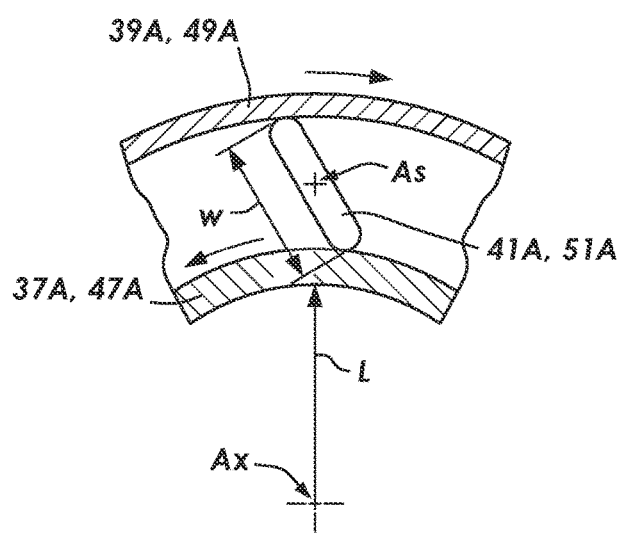

Shown schematically in FIGS. 7A and 7B, which are taken along lines 7A,B-7A,B of FIG. 6, are examples of how orientation of clutch members 41A, 51A changes of relative rotation of outer races 39A, 49A with respect to inner races 37A, 47A; and how orientation of clutch members 41A, 51A affects engagement and disengagement between outer races 39A, 49A and inner races 37A, 47A. For the purposes of discussion herein, clutch members 41A, 51A have lengths substantially parallel with axis $A_S$, and widths W and thicknesses transverse to axis $A_S$, with the widths greater than the thicknesses. In the example of FIG. 7A, which illustrates an example of clutches 35A, 45A in a disengaged configuration allows outer races 39A, 49A to be rotating counterclockwise with respect to inner races 37A, 47A, while inner races 37A, 47A are stationary, or while inner races 37A, 47A are rotating clockwise with respect to outer races 39A, 49A. With this scenario of rotation by races 37A, 47A, 39A, 49A, clutch members 41A, 51A pivot in the annular space between the races 37A, 47A and races 39A, 49A, so that their widths W are oblique to a line L shown radially extending from axis $A_X$; while in this orientation clutch members 41A, 51A do not impede rotation of races 37A, 47A with respect to races 39A, 49A or vice versa. While in the orientation shown in FIG. 7A, lateral edges of clutch members 41A, 51A are in sliding contact with races 37A, 47A and races 39A, 49A; or alternatively, clutch members 41A, 51A are out of the path of the respective rotation of either of the races 37A, 47A and races 39A, 49A; and which leaves gaps $G_1$, $G_2$ respectively between the clutch members 41A, 51A and the inner races 37A, 47A, and the outer races 39A, 49A. Clutches 35A, 45A are in the disengaged configuration when there is sliding contact between clutch members 41A, 51A and races 37A, 47A, 39A, 49A, or gaps $G_1$, $G_2$ are present.

Shown in FIG. 7B, is an example of clutches 35A, 45A in an engaged configuration, which does impede relative rotation of inner races 37A, 47A relative to outer races 39A, 49A. Transformation into the engaged configuration can be initiated at a time when all races 37A, 47A, 39A, 49A are stationary, or at a time immediately subsequent to, or when, there is relative rotation between races 37A, 47A, 39A, 49A. In this example, the clutch members 41A, 51A are oriented with their widths W extending along a line substantially parallel with line L shown extending radially from axis $A_X$. The widths W are dimensioned so that when the clutch members 41A, 51A are radially orientated as shown in FIG. 7B, opposing lateral edges of clutch members 41A, 51A are in contact with respective outer and inner surfaces of races 37A, 47A, 39A, 49A. This contact between clutch members 41A, 51A and races 37A, 47A, 39A, 49A wedges clutch members 41A, 51A between the races 37A, 47A, 39A, 49A, so that radial forces are transmitted between races 37A, 47A, 39A, 49A through the widths W of the clutch members 41A, 51A. Wedging clutch member 41A between races 37A, 39A rotationally engages inner race 37A with outer race 39A, which in turn couples shaft 28 with housing 34. Similarly, wedging clutch member 51A between races 47A, 49A rotationally engages inner race 47A with outer race 49A, which in turn couples shaft 28 with shaft 31. In alternatives and as described in more detail below, relative rotational directions for engaging/disengaging clutches 35, 35A are opposite to the rotational directions for engaging/disengaging clutches 45, 45A.

In an example, the clutch assembly 40 is configured so that rotation of the motor shaft 31 in a first direction results in an engaged configuration, causes rotational coupling of the motor shaft 31 with the pump shaft 28 and to correspondingly rotate pump shaft 28 in that same first direction. Further in this example, the clutch assembly 50 is configured so that rotation of the pump shaft 28 in the first direction results in a disengaged configuration and in which pump shaft 28 is rotatable in the first direction with respect to the housing 34, i.e., inner and outer races 47, 49 are rotatable with respect to one another in the first direction. Still in this example, rotation of pump shaft 28, such as caused by reverse rotation of fluid flowing across impellors that results in rotation of pump shaft 28 in a second direction that is opposite first direction, causes clutch assembly 50 to be in an engaged configuration to rotationally couple pump shaft 28 with housing 34 and thereby arrest rotation of driveshaft assembly 23; which prevents backspin in motor shaft 31. In the configuration of this example, rotation of the pump shaft 28 in the first direction (i.e., rotation of pump shaft 28 caused from something other than rotation of motor shaft 31), clutch assembly 50 does not impede rotation of pump shaft 28 with respect to housing 34 (or impede relative rotation of races 47, 49) as the rotation in the first direction the clutch assembly 50 is in the disengaged configuration. Further, the pump shaft 28 when rotating in the first direction due to a force other than rotation of motor shaft 31, is rotatable with respect to motor shaft 31, as the relative rotation of the pump shaft 28 and motor shaft 31 is in a direction opposite of the direction that puts the clutch assembly 40 into the engaged configuration, and which rotationally couples the pump shaft 28 and motor shaft 31. In this scenario, rotation of the driveshaft assembly 21 is arrested by configuring the clutch assembly 40 so that rotational torque is not transferred between shafts 28, 31 when rotational force is imparted onto the pump shaft 28 in the first direction and by something other than the rotation of the motor shaft 31. Examples of arresting/impeding rotation or arresting/impeding a rotational force include selectively coupling a member to a fixed structure to prevent rotation of the member (e.g. coupling the pump shaft 28 to the housing 34), and selectively configuring members in a drive train to be in a disengaged mode so that rotational force is not transmitted across the drive train (e.g. allowing free rotation between the shafts 28, 30 when one or both are rotating in a designated direction relative to one another).

In a non-limiting example of operation, clutch assembly 40 (FIG. 2) in shaft-to-shaft clutch is: (1) configured to be put into, or be in, the engaged configuration by rotation of the motor shaft 31 in a first direction (when viewed from surface S) that is counterclockwise to the motor shaft 31; and (2) configured to be put into, or be in, the disengaged configuration by rotation of the motor shaft 31 in a second direction (when viewed from surface S) that is clockwise to the motor shaft 31; and (3) clutch assembly 50 in the shaft to housing clutch 45 is configured to be put into, or be in, the disengaged configuration by rotation of the pump shaft 28 in a direction (when viewed from surface S) that is counterclockwise to the housing 34; and (4) is configured to be put into, or be in, the engaged configuration by rotation of the pump shaft 28 in a direction (when viewed from surface S) that is clockwise to the housing 34. With clutch assembly 40 is in the engaged configuration and clutch assembly 50 in the disengaged configuration, motor shaft 31 is rotationally coupled with pump shaft 28, and pump shaft 28 is rotatable with respect to the housing 34; and continuity along driveshaft assembly 23 is maintained (i.e. rotational force applied to an end or a portion of driveshaft assembly 23 is transmitted along substantially an entire length of the driveshaft assembly 23). In this example, an output shaft (not shown) of motor 17 rotates in the first direction when motor 17 is energized, so that when electricity is transmitted from surface S into the well 12 (FIG. 1) via cable, which energizes motor 17 causing motor shaft 31 and pump shaft 28 to rotate in the first direction that in turn rotate impellers in pump 13. Further in this example, when motor 17 is idle and not being energized and a column of liquid is uphole of and collected on impellers, rotation of the motor shaft 31 in the second direction (i.e., backspin direction) from the static head of the liquid on the impellers, is prevented by the clutch assembly transforming into the engaged configuration by rotation of pump shaft 28 in the second direction with respect to housing 34. Arresting rotation of pump shaft 28 disrupts rotational continuity of the driveshaft assembly 23 and prevents induced rotation of impellers in pump 13 (due to liquid column static head) from being transferred along driveshaft assembly 23 to motor shaft 31 and motor 17. Rotationally continuity along driveshaft assembly 23, when pump shaft 28 rotates in the second direction, is also disrupted by clutch assembly 40; which transforms into the disengaged configuration by rotation of pump shaft 28 in the second or clockwise direction, so that any rotational torque in pump shaft 28 (such as by a malfunction in clutch assembly 50) in the second direction is not transferred to motor shaft 31. In an example, sub 21 defines a one-way clutch train that limits driveshaft assembly 23 rotation between motor 17 and pump 13 (FIG. 1) to a single rotational direction.

Figure 8:
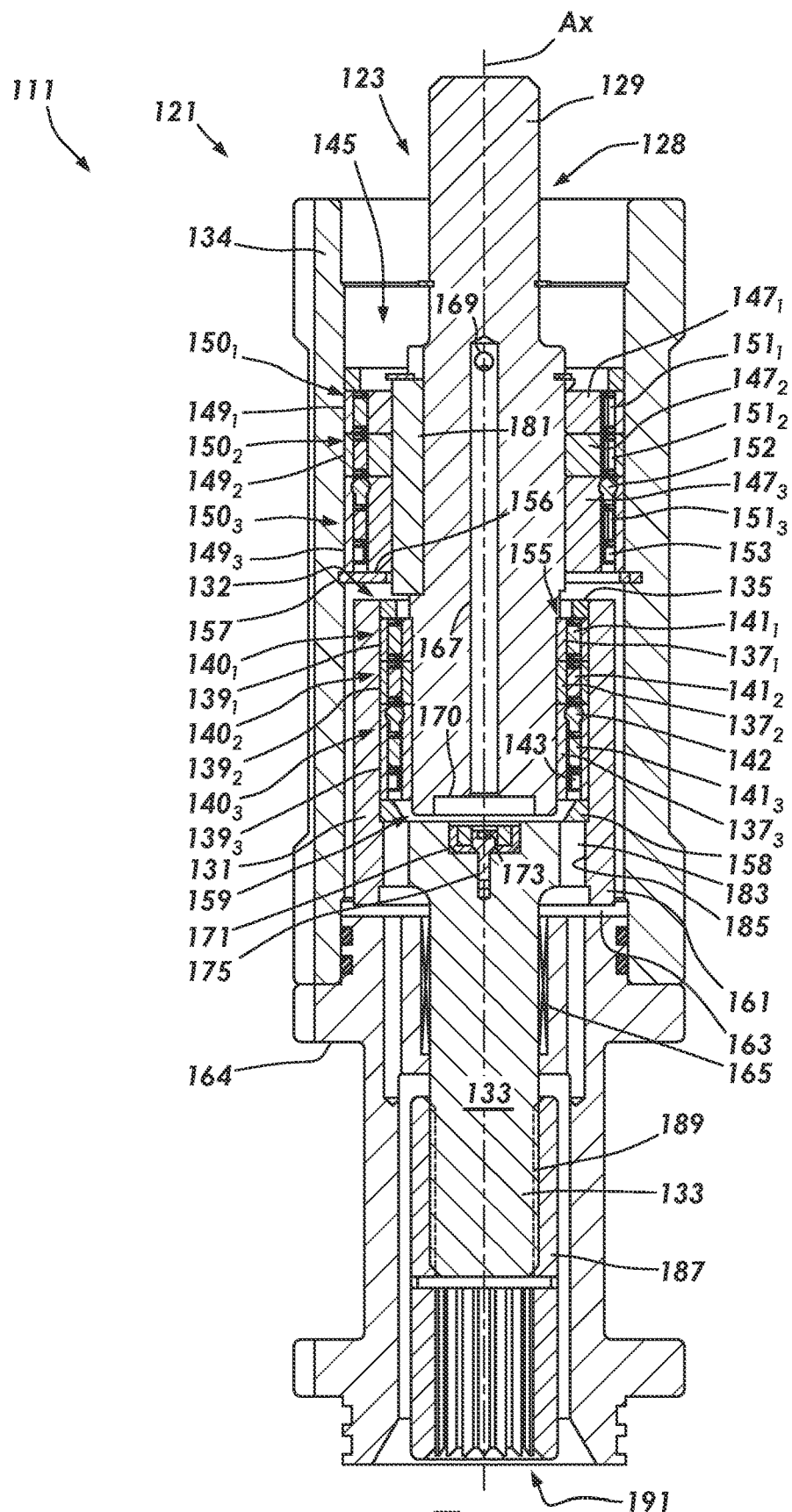
FIG. 8 is a side sectional view of an alternate example of the reverse rotation arresting sub of FIG. 2.

Shown in a side sectional view in FIG. 8 is an alternate example of an ESP assembly 111 for use in well 12 (FIG. 1). ESP assembly 111 is similar to assembly 11 of FIG. 2, and includes a reverse rotation arresting sub 121, and a driveshaft assembly 123. Included with driveshaft assembly 123 is a pump shaft 128 with an uphole end 129 for connection to pump 13 (FIG. 1) and a downhole end 130, driveshaft assembly 123 further includes a motor shaft 131 having a receptacle 132 shown coupled with end 130. An end 133 of motor shaft 131 opposite receptacle 132 selectively couples with motor 17 (FIG. 1). An outer housing 134 covers driveshaft assembly 123. A shaft-to-shaft clutch 135 is shown in an annulus between pump shaft 128 and inner surface of receptacle 132, and which provides selective coupling between pump shaft 128 and motor shaft 131. Shaft-to-shaft clutch 135 includes inner races $137_{1-3}$ press fit to an outer surface of pump shaft 128, and outer races $139_{1-3}$ press fit to an inner surface of receptacle 132. Clutch 135 also includes clutch assemblies $140_{1-3}$ that are formed by installing clutch members $141_{1-3}$ and bearings 142, 143 between races $137_{1-3}$, $139_{1-3}$. In an embodiment, clutch assemblies $140_{1-3}$ are substantially coaxial with one another and axial abutting contact. As shown, clutch members $141_{1-3}$ are sprag type elements and similar to members 41A, 51A (FIGS. 6, 7A, 7B), bearings 142 are spherical or ball bearings, and bearings 143 are needle or roller type bearings. In the example of FIG. 8, clutch assemblies $140_{1,2}$ are made up of a single row of clutch members $141_{1-3}$ between races $137_{1,2}$, $139_{1,2}$, and clutch assembly $140_3$ is shown made up of clutch members $141_3$ and bearings 142, 143 that are axially stacked in the annulus between races $137_3$, $139_3$.

A shaft to housing clutch 145 is shown in an annulus between pump shaft 128 and inner surface of housing 134, and which provides selective coupling between pump shaft 128 and housing 134. Shaft to housing clutch 145 includes inner races $147_{1-3}$ press fit to an outer surface of pump shaft 128, and outer races $149_{1-3}$ press fit to an inner surface of housing 134. Clutch 145 includes clutch assemblies $150_{1-3}$ that are formed by installing clutch members $151_{1-3}$ and bearings 152, 153 between races $147_{1-3}$, $149_{1-3}$. As shown, clutch members $151_{1-3}$ are sprag type elements and similar to clutch members $141_{1-3}$, bearings 152 are spherical or ball bearings, and bearings 153 are needle or roller type bearings. In the example of FIG. 8, clutch assemblies $150_{1,2}$ are made up of a single row of clutch members $151_{1-3}$ between races $147_{1,2}$, $149_{1,2}$, and clutch assembly $150_3$ is formed by axially stacking clutch members $151_3$ and bearings 152, 153 in the annular space between races $137_3$, $139_3$.

In the embodiment of FIG. 8, an axial dimension of clutch assemblies $140_3$, $150_3$ exceeds that of clutch assemblies $140_{1,2}$, $150_{1,2}$ and optionally, clutch assemblies $140_{1-3}$, $150_{1-3}$ are substantially coaxial and in axial abutting contact with one another. An advantage realized by clutches 135, 145 with different types of clutch assemblies $140_{1-3}$, $150_{1-3}$, i.e., some with only sprag type elements and others with a combination of bearings and sprag type elements, is that dimensions of the clutches 135, 145 can be reduced without a reduction in structural capabilities.

In the ESP assembly 111 of FIG. 8, similar to ESP assembly 11 of FIG. 2, a downward facing shoulder 155 is formed in pump shaft 128 that defines an axial back stop for clutch 135. A snap ring 156 is shown set in a groove 157 that circumscribes an inner surface of housing 134, and is an example of an alternative to the ridge 54 of FIG. 2 for axially supporting clutch 145 within housing 134. In the example shown, clutch 145 is removable from within housing by removing snap ring 156. A ring 158 is shown circumscribing a lower edge within recess 132, and in axial abutment with a downhole end of clutch 135. The space 159, skirt 161, thrust bearing 163, base section 164, and journal bearing 165 of FIG. 8 are similar to the gap 59, skirt 61, thrust bearing 63, base section 64, and journal bearing 65, respectively, of FIG. 2.

Further illustrated in the example of FIG. 8 is a passage 167 shown extending axially within a portion of pump shaft 128, and that intersects a port 169 that extends radially from passage 167 through an outer surface of the pump shaft 128. An enlarged diameter portion of passage 167 is formed in an end of pump shaft 128 disposed in recess 132 and adjacent space 159. Port 169 and opening 170 provide communication between passage 167 and to outside of pump shaft 128. A sump 171 is shown formed on a lower surface of receptacle 132 and that faces opening 170. A magnet 173 is held within the sump 171 by a fastener 175. In examples, cooling and/or lubricating fluid circulates through passage 167, where the flow of the fluid is induced by rotation of shaft 128; and metal particles in the fluid are captured by magnet 173 and retained in the sump 171. Inner races 147$_{1-3}$ are shown rotationally coupled with pump shaft 128 by an elongate key 181 fitted into grooves formed axially in the races 147$_{1-3}$ and pump shaft 128. Apertures 183 are shown formed through a bottom of recess 132; apertures 183 include threads 185 for inserting a threaded bolt (not shown) to remove clutch 135 from within recess 132. A coupling 187 is shown for coupling motor shaft 131 to an output shaft (not shown) of motor 17 (FIG. 1), coupling 187 has a splined end 189 engaging end 133 of motor shaft 131 and an opposite splined end 191 for engagement with motor output shaft.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. An electrical submersible pumping ("ESP") system comprising:
    a driveshaft assembly that comprises elongated segments that include a pump shaft;
    an electrical motor coupled with an end of the driveshaft assembly, and that when energized rotates the driveshaft assembly in a first direction;
    a pump coupled with an end of the driveshaft assembly distal from the motor; and
    a one-way clutch train in the driveshaft assembly that is rotationally disengaged with the driveshaft assembly when the driveshaft assembly rotates in the first direction, and that is rotationally engaged with the driveshaft assembly when the driveshaft assembly rotates in a second direction that is opposite to the first direction, and that comprises,
        a shaft-to-shaft clutch comprising,
            an outer race on an outer surface of one of the segments,
            an inner race on an inner surface of an adjacent segment, and
            sprag type elements between the inner and outer races, and
        a shaft to housing clutch coupled between the one of the segments and an outer housing, the shaft to housing clutch being selectively changeable between an engaged configuration and a disengaged configuration, and when the shaft to housing clutch is in the engaged configuration, the housing is rotationally coupled to the one of the segments by the shaft to housing clutch, and when the shaft to housing clutch is in disengaged configuration the one of the segments is rotatable with respect to the housing.

2. The system of claim 1, wherein one of the segments comprises a pump shaft and another one of the segments comprises a motor shaft, the pump shaft having an end selectively coupled with an end of the motor shaft, wherein opposing ends of the pump and motor shafts respectively couple with the pump and motor.

3. The system of claim 1, wherein changing a rotational direction of the pump shaft changes the shaft to housing clutch between the engaged configuration and the disengaged configuration.

4. The system of claim 2, wherein the shaft-to-shaft clutch is selectively changeable between an engaged configuration and a disengaged configuration, wherein when in the engaged configuration the motor shaft is rotationally coupled to the pump shaft by the shaft-to-shaft clutch, and wherein when in the disengaged configuration the pump shaft is rotatable with respect to the motor shaft.

5. The system of claim 4, wherein changing a rotational direction of the motor shaft changes the shaft-to-shaft clutch between the engaged configuration and the disengaged configuration.

6. The system of claim 1, wherein the sprag type elements are generally planar elements that are pivotable about an axis that is substantially parallel with an axis of the ESP assembly.

7. The system of claim 6, wherein the sprag type elements are strategically dimensioned so that opposing ends of the sprag type elements are wedged between the inner and outer races when elongate widths of the sprag type elements are oriented radially from the axis, wherein the sprag type elements are selectively oriented radially from the axis in response to rotation of the outer race with respect to the inner race in a first direction.

8. The system of claim 7, wherein when the sprag type elements become wedged between the inner and outer races, and the shaft-to-shaft clutch assembly between the outer race and the inner race is in an engaged configuration and relative rotation of the outer race to the inner race in a first direction is arrested.

9. The system of claim 7, wherein the sprag type elements are in sliding contact with the inner and outer races when the elongate widths of the sprag type elements are oriented oblique to the axis, and wherein the sprag type elements are selectively oriented oblique to the axis in response to rotation of the outer race with respect to the inner race in a second direction that is opposite the first direction.

10. An electrical submersible pumping ("ESP") system comprising:
  a driveshaft assembly that comprises elongated segments;
  an electrical motor coupled with an end of the driveshaft assembly, and that when energized rotates the driveshaft assembly in a first direction;
  a pump coupled with an end of the driveshaft assembly distal from the motor, one of the segments comprising a motor shaft and another one of the segments comprising a pump shaft having an end selectively coupled with an end of the motor shaft, and opposing ends of the pump and motor shafts being respectively coupled with the pump and motor,
  a one-way clutch train in the driveshaft assembly that is rotationally disengaged with the driveshaft assembly when the driveshaft assembly rotates in the first direction, and that is in rotationally engaged with the driveshaft assembly when the driveshaft assembly rotates in a second direction that is opposite to the first direction, and that comprises:
    a shaft-to-shaft clutch comprising an outer race on an outer surface of one of the segments, an inner race on an inner surface of an adjacent segment, and sprag type elements between the inner and outer races, the motor shaft comprises a receptacle that receives the end of the pump shaft distal from the pump and wherein the shaft-to-shaft clutch is disposed in the receptacle.

11. The system of claim 10, wherein the outer race is press fit inside the receptacle, and the inner race is press fit onto an outer surface of the pump shaft.

12. An electrical submersible pumping ("ESP") system comprising:
  a housing;
  an electrical motor that when energized generates rotational force in a first direction;
  a pump; and
  a driveshaft assembly coupled between the motor and the pump and that comprises,
    a pump shaft having an end coupled with the pump,
    a motor shaft having an end coupled with the motor,
    a shaft-to-shaft clutch comprising,
      a first plurality of sprag type elements disposed in an annulus between the pump shaft and motor shaft, the first plurality of sprag type elements being changeable between a radial orientation in which opposing lateral edges of the sprag type elements are wedged between inner and outer races mounted respectfully on the pump shaft and motor shaft and a rotational torque is transferred between the pump shaft and motor shaft through the plurality of sprag type elements, and an oblique orientation in which the pump shaft and motor shaft are rotatable with respect to one another and pump shaft and motor shaft are each in selective sliding contact with the sprag type elements, and
    a shaft to housing clutch comprising,
      a second plurality of sprag type element disposed in an annulus between the pump shaft and housing the second plurality of sprag type elements being changeable between a radial orientation in which a rotational torque is transferred between the pump shaft and housing through the second plurality of sprag type elements, and an oblique orientation in which the pump shaft is rotatable with respect to the housing.

13. The system of claim 12, wherein the first plurality of sprag type elements are in the radial orientation when the motor shaft is rotated by the motor in a first direction so that the pump shaft is also rotated in the first direction, and wherein the second plurality of sprag type elements are in the oblique configuration when the pump shaft is rotated in the first direction, so that when the motor is energized, rotational torque from the motor is transferred to the pump through the driveshaft assembly.

14. The system of claim 12, wherein the second plurality of sprag type elements are in the radial configuration when a rotational torque is applied to the pump shaft in a second direction that is opposite to the first direction, which rotationally couples the pump shaft to the housing and arrests rotation of the pump shaft, wherein the first plurality of sprag type elements are in the radial orientation when the motor shaft is rotated by the motor in a first direction so that the pump shaft is also rotated in the first direction, and so that when the motor is energized, rotational torque from the motor is transferred to the pump through the driveshaft assembly.

15. An electrical submersible pumping ("ESP") system comprising:
  a housing;
  an electrical motor that when energized generates rotational force in a first direction;
  a pump; and
  a driveshaft assembly coupled between the motor and the pump and that comprises,
    a pump shaft having an end coupled with the pump,
    a motor shaft having an end coupled with the motor, and
    a shaft-to-shaft clutch comprising a plurality of sprag type elements disposed in an annulus between the pump shaft and motor shaft, the sprag type elements being changeable between a radial orientation in which a rotational torque is transferred between the pump shaft and motor shaft through the plurality of sprag type elements, and an oblique orientation in which the pump shaft and motor shaft are rotatable with respect to one another,
    wherein the pump shaft includes an axial passage, a port extending radially to an outer surface of the pump shaft from the passage, and an opening in the passage at a downhole end of the pump shaft, and wherein a magnetic sump is provided adjacent the opening, so that when the pump shaft rotates, a fluid flow is induced into the opening, through the passage, and out the port that receives thermal energy from the bearings, and wherein metal particles are pulled from the fluid flow and retained in the sump.

* * * * *